(12) United States Patent
Fernandez et al.

(10) Patent No.: US 12,298,401 B2
(45) Date of Patent: May 13, 2025

(54) OBJECT RECOGNITION BY AN ACTIVE OPTICAL SENSOR SYSTEM

(71) Applicant: Valeo Schalter und Sensoren GmbH, Bietigheim-Bissingen (DE)

(72) Inventors: Sergio Fernandez, Bietigheim-Bissingen (DE); Christoph Pfrang, Bietigheim-Bissingen (DE); Viktor Trusov, Bietigheim-Bissingen (DE); Ali Bassiouny, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 294 days.

(21) Appl. No.: 17/914,996

(22) PCT Filed: Mar. 22, 2021

(86) PCT No.: PCT/EP2021/057177
§ 371 (c)(1),
(2) Date: Sep. 27, 2022

(87) PCT Pub. No.: WO2021/191102
PCT Pub. Date: Sep. 30, 2021

(65) Prior Publication Data
US 2023/0152457 A1    May 18, 2023

(30) Foreign Application Priority Data
Mar. 27, 2020   (DE) .................... 10 2020 108 473.0

(51) Int. Cl.
*G01S 17/89* (2020.01)
*B60W 60/00* (2020.01)
(Continued)

(52) U.S. Cl.
CPC .............. *G01S 17/89* (2013.01); *B60W 60/00* (2020.02); *G01S 7/4865* (2013.01); *G01S 17/931* (2020.01); *B60W 2420/408* (2024.01)

(58) Field of Classification Search
CPC ...... G01S 17/89; G01S 7/4865; G01S 17/931; G01S 7/4802; G01S 7/487; B60W 60/00;
(Continued)

(56) References Cited

U.S. PATENT DOCUMENTS

2004/0257556 A1    12/2004  Samukawa et al.
2017/0300059 A1*   10/2017  Rust .................... G05D 1/0231
(Continued)

FOREIGN PATENT DOCUMENTS

DE      102012021830 A1    5/2014
EP          1557694 B1     10/2008

OTHER PUBLICATIONS

Search Report issued in corresponding German Application No. 10 2020 108 473.0, dated Jan. 25, 2021 (11 pages).
(Continued)

*Primary Examiner* — Rodney A Butler
(74) *Attorney, Agent, or Firm* — Osha Bergman Watanabe & Burton LLP

(57) ABSTRACT

According to a method for object recognition by an active optical sensor system (2), a detector unit (2b) detects light (3b) reflected off an object (4) and generates a sensor signal (5a, 5b, 5c, 5d, 5e, 5f) on the basis thereof. A computing unit (2c) ascertains a first pulse width (D1) defined by a predetermined first limit value (G1) for an amplitude of the sensor signal (5a, 5b, 5c, 5d, 5e, 5f) as well as a second pulse width (D2) defined by a predetermined second limit value (G2). The signal pulse is assigned to one of at least two categories according to at least one predefined signal pulse parameter, and a scatter plot for object recognition is generated, said
(Continued)

scatter plot containing exactly one entry for the signal pulse, said entry corresponding to the first pulse width (D1) or to the second pulse width (D2) according to the category to which the signal pulse belongs.

12 Claims, 4 Drawing Sheets

(51) Int. Cl.
  *G01S 7/48* (2006.01)
  *G01S 7/4865* (2020.01)
  *G01S 17/93* (2020.01)
  *G01S 17/931* (2020.01)
(58) Field of Classification Search
  CPC ......... B60W 2420/408; G06F 2218/16; G06V 20/56
  See application file for complete search history.

(56) References Cited

U.S. PATENT DOCUMENTS

| | | | |
|---|---|---|---|
| 2018/0321360 A1* | 11/2018 | Hall | G01S 7/4876 |
| 2019/0178998 A1 | 6/2019 | Pacala et al. | |
| 2019/0370614 A1 | 12/2019 | Crouch et al. | |
| 2021/0132197 A1* | 5/2021 | Wachter | G01S 17/931 |

OTHER PUBLICATIONS

International Search Report and Written Opinion in corresponding International Application No. PCT/EP2021/057177, dated Jun. 28, 2021 (18 pages).

Office Action issued in counterpart Korean Patent Application No. 10-2022-7033589 mailed Oct. 22, 2024 (12 pages).

* cited by examiner

OBJECT RECOGNITION BY AN ACTIVE OPTICAL SENSOR SYSTEM

The present invention relates to a method for object recognition by an active optical sensor system, wherein reflected light in an environment of the sensor system is registered by means of a detector unit of the sensor system and an object, and a sensor signal is generated on the basis of the registered light, and a first pulse width of a signal pulse of the sensor signal is determined by means of a computer unit, the first pulse width being established by a predetermined first limit value for an amplitude of the sensor signal. The invention furthermore relates to a method for the at least partially automatic control of a motor vehicle, to an active optical sensor system, to an electronic vehicle guidance system for a motor vehicle, to computer programs and to a computer-readable storage medium.

Active optical sensor systems such as lidar systems may be fitted on motor vehicles in order to carry out various functions of electronic vehicle guidance systems or driver assistance systems. These functions include distance measurements, distance control algorithms, lane-keeping assist systems, object tracking functions, object recognition functions, object classification functions and the like.

The detected light in this case leads to an analog signal pulse having a time profile which reproduces the intensity of the detected light. In order to represent this information discretely, the signal pulse may for example be described by a particular pulse width which is defined by the time during which the pulse lies above a particular limit value.

The selection of the limit value for determining the pulse width in this case generally has an influence on various qualitative aspects of the resulting point cloud. The greater the limit value is selected to be, the lower is the sensitivity, or the effective range, of the active optical sensor system since the typical maximum amplitude of the sensor signal becomes smaller and smaller with an increasing distance from the sensor system. If the limit value is thus selected to be too high, only objects which lie relatively close to the sensor system tend to be reproduced in the point cloud. On the other hand, the influence of noise effects becomes commensurately greater when the limit value is selected to be lower. In the case of very low limit values, signal pulses that do not correspond to reflections of real objects in the environment of the sensor system potentially also lead to entries in the point cloud. Document EP 1 557 694 B1 describes a method for classifying objects. In this case, the environment of a motor vehicle is sampled with a laser scanner and the echo pulse width of the reflected light pulse received is evaluated. A threshold value which the light pulse must exceed is defined, and the time difference from the threshold value being exceeded until the threshold value is subsequently fallen below is defined as the echo pulse width of the light pulse.

Against this background, it is an object of the present invention to provide an improved concept for object recognition by an active optical sensor system, by which the influence of noise effects can be reduced or kept small, while at the same time the sensitivity of the sensor system can be increased or kept the same.

According to the invention, this object is achieved by the respective subject matter of the independent claims. Advantageous refinements and further configurations are the subject matter of the dependent claims.

The improved concept is based on the idea of generating a hybrid point cloud by identifying one of at least two categories for each signal pulse and, as a function of the category, generating an entry for the signal pulse in the point cloud which corresponds either to a first pulse width or to a second pulse width of the signal pulse, the different pulse widths corresponding to different limit values for the amplitude of the sensor signal.

According to the improved concept, a method for object recognition by an active optical sensor system, in particular an active optical sensor system of a motor vehicle or for a motor vehicle, is provided. Light reflected by an object in an environment of the sensor system is registered by means of a detector unit of the sensor system and a sensor signal is generated by means of the detector unit on the basis of the registered light. A first pulse width of a signal pulse of the sensor signal is determined by means of a computer unit, in particular of the sensor system or of the motor vehicle, the first pulse width being established by a predetermined first limit value for an amplitude of the sensor signal. A second pulse width of the signal pulse is determined by means of the computer unit, the second pulse width being established by a predetermined second limit value, which is in particular different than the first limit value, for the amplitude of the sensor signal. The signal pulse is assigned by means of the computer unit to one, in particular precisely one, of at least two predetermined categories as a function of at least one predefined parameter of the signal pulse. A point cloud for object recognition, which contains precisely one entry for the signal pulse, is generated by means of the computer unit. The entry corresponds either to the first pulse width or to the second pulse width as a function of the category of the signal pulse, that is to say the category to which the signal pulse has been assigned.

Here and below, an active optical sensor system may be defined as one that has an emitter unit with a light source, in particular for emitting the light, for example in the form of light pulses. The light source may, in particular, be configured in the form of a laser. Furthermore, an active sensor system has the detector unit with at least one optical detector, in particular for registering light or light pulses, in particular reflected components of the emitted light.

Here and below, the term "light" may be understood as comprising electromagnetic waves in the visible range, in the infrared range, and/or in the ultraviolet range. Accordingly, the term "optical" may also be understood as relating to light in this sense.

The light which is emitted by the active optical sensor system may in particular include infrared light, for example having a wavelength of 905 nm, approximately 905 nm, 1200 nm or approximately 1200 nm. These wavelength specifications may in this case respectively relate to a wavelength range having a broader distribution, as is typical of the corresponding light source.

In the present case of the active optical sensor system, the light source may, for example, be a laser light source. The wavelengths mentioned may, within the framework of customary tolerances, correspond for example to peak wavelengths of the laser spectrum.

In particular, light is emitted in the direction of the object by means of an emitter unit of the sensor system and the reflected light registered consists of components of the emitted light that are reflected by the object.

The point cloud may for example be understood as a set of data points having a multiplicity of entries, each entry corresponding to a corresponding signal pulse of a sensor signal that has been generated by the detector unit. Various entries may in this case originate from the same sensor signal if the sensor signal contains a plurality of signal pulses, which are also referred to as echoes. Each entry, however, is assigned to precisely one signal pulse.

Each entry may for example contain a multiplicity of parameters or other information items for the corresponding signal pulse. For example, an entry may contain coordinates in two or three dimensions for a corresponding point in the environment of the sensor system, from which the light has correspondingly been reflected and which has led to the corresponding signal pulse after registering by the detector unit. The coordinates may, for example, be in the form of polar coordinates or Cartesian coordinates. The entry may, for example, also contain an echo number of the corresponding signal pulse. The echo number then corresponds, for example, to a corresponding position of the signal pulse in a series of successive signal pulses of the same sensor signal.

Furthermore, the entry may in principle contain information items relating to a pulse width or a maximum signal amplitude of the signal pulse. According to the improved concept, however, each entry of the point cloud contains precisely value relating to the pulse width, namely either a value for the first pulse width or a value for the second pulse width, but 5 not both.

It is, however, also possible for individual signal pulses or various signal pulses not to generate an entry.

That the entry corresponds either to the first or the second pulse width may be understood as meaning that the entry contains a value which is proportional or equivalent to the first or the second pulse width. That the point cloud contains precisely one entry for the signal pulse is, in particular, to be understood as meaning that the point cloud contains no further entry for the same signal pulse. Of course, the point cloud may however contain further entries for further signal pulses which belong to the same sensor signal or to another sensor signal.

The point cloud may be used for object recognition, that is to say in particular for the classification of the object, by the computer unit or a further computer unit. The point cloud may therefore be referred to as a point cloud for object recognition.

According to the improved concept, as described, different pulse widths or different limit values for the signal amplitude are thus used depending on the parameter of the signal pulse. On the one hand, this prevents signal pulses which do not correspond to reflections of real objects, but which occur for example because of noise, from being taken into account in the further processing of the point cloud. At the same time, however, it achieves the effect that the fewest possible signal pulses which are due to a real reflection of a real object are ignored.

In other words, in this way on the one hand the influence of noise effects is reduced, which corresponds to a higher reliability of the object recognition according to the improved concept, and on the other hand the sensitivity or effective range of the sensor system is high.

Furthermore, the method according to the improved concept saves on memory space for the storage of the point cloud since it contains only one entry for each signal pulse. If two point clouds were generated, for example, one for the first limit value, and the corresponding first pulse width and one for the second limit value and the corresponding second pulse width, the storage requirement would be significantly higher. This also applies in particular when the entries contain corresponding information items relating to the assigned category, for example a flag or an identifier.

According to at least one embodiment of the method according to the improved concept, a radial distance of the object from the sensor system is determined by means of the computer unit as a function of the signal pulse. The signal pulse is assigned by means of the computer unit to the one of at least two categories as a function of the radial distance.

The radial distance may, for example, in this case be determined by a time-of-flight (ToF). The longer the time duration between the emission of the emitted light and the detection of the corresponding signal pulse is, the greater is the time-of-flight and the greater is the corresponding radial distance.

The radial distance is particularly suitable as a parameter of the signal pulse for categorization of the signal pulse, since with an increasing radial distance it becomes ever less likely that a signal pulse will exceed a certain amplitude. In other words, the maximum amplitude of the signal pulses becomes ever smaller with an increasing radial distance. It may therefore make sense to use a lower limit value for determining the pulse width in the case of large radial distances and to use a higher limit value in the case of smaller radial distances, particularly in order to reduce the influence of noise.

In particular, the signal pulse may be assigned to a first category of the at least two categories if the radial distance is greater than a predetermined limit distance. On the other hand, the signal pulse may be assigned to a second category or a third category of the at least two, optionally at least three, categories if the radial distance is less than the limit distance.

According to at least one embodiment, the second limit value is greater than the first limit value.

According to at least one embodiment, the signal pulse is assigned by means of the computer unit to the first category of the at least two categories if the radial distance is greater than the predefined limit distance. The point cloud is generated by means of the computer unit with the entry which corresponds to the first pulse cloud if the signal pulse has been assigned to the first category.

In such embodiments, the radial distance corresponds to one of the parameters for the signal pulse.

If the radial distance is greater than the limit distance, it may be assumed with a high probability that the signal pulse has not occurred because of noise. Accordingly, it is advantageous to take into account the lower first limit value and correspondingly the first pulse width for the generation of the point cloud, in order to be able to represent objects as far away as possible in the point cloud. Accordingly, the sensitivity of the optical sensor system is thereby increased.

According to at least one embodiment, the signal pulse is assigned, in particular by means of the computer unit, to a second category of the at least two categories if the radial distance is less than the limit distance and the second pulse width is greater than zero. The point cloud is generated by means of the computer unit with the entry which corresponds to the second pulse width if the signal pulse has been assigned to the second category.

In such embodiments, the second pulse width also corresponds to one of the parameters of the signal pulse.

If the radial distance is less than the limit distance, it may be assumed with a high probability that pulses which are due to reflections from genuine objects deliver maximum amplitudes which are greater than the second limit value. In other words, it may be assumed that those signal pulses whose maximum amplitude does not reach the second limit value, for which the second pulse width is thus correspondingly equal to zero, are due to noise effects. Accordingly, for such small radial distances it is advantageous to employ the second pulse width for the generation of the point cloud. In this way, the influence of noise is reduced.

According to at least one embodiment, the at least two categories contain at least three categories or precisely three categories. In particular, the at least two categories contain the first category, the second category and a third category. The signal pulse is assigned, in particular by means of the computer unit, to the third category of the at least three categories if the radial distance is less than the limit distance and the second pulse width is equal to zero. The point cloud is generated, in particular by means of the computer unit, with the entry which corresponds to the first pulse width if the signal pulse has been assigned to the third category.

In this case, only the first pulse width is relevant since the second pulse width is equal to zero. Accordingly, the entry is generated with the first pulse width. If the radial distance is less than the limit distance and the second pulse width is equal to zero, it may be assumed with a high probability that the corresponding signal pulse is due to signal noise or other noise effects.

This information may, for example, be stored by means of an identifier in the point cloud so that entries of signal pulses of the third category are not further taken into account for particular subsequent applications.

According to at least one embodiment, the entry contains an identifier that indicates the category to which the signal pulse has been assigned.

The identifier may thus be understood as a flag which can assume as many different values as there are different categories for the signal pulses.

Subsequent applications, for example for object classification or the like, may determine with the aid of the identifier the pulse width to which the entry respectively relates, and may correspondingly use this individually.

Storing the identifier entails only a very small memory outlay. In the case of two categories, only one bit per entry is required, and only two bits per entry are required in the case of three or four categories. Particularly in comparison with the storage of two complete entries, for example if two different point clouds have been stored, this leads to a significant saving of memory space.

According to at least one embodiment, the object is classified automatically, in particular by means of the computer unit, on the basis of the point cloud while taking the entry into account.

The classification is carried out, in particular, on the basis of the first pulse width or the second pulse width, depending on which of the two pulse widths the entry corresponds to.

According to at least one embodiment, the classification is carried out as a function of the identifier of the entry.

For example, entries whose identifier indicates the third category may not be used for classification. Since, as described above, the entries with respect to the third category indicate the influence of noise effects, the influence of the latter on the classification may thereby be reduced, which can lead to a more reliable or more accurate classification.

According to at least one embodiment, the second limit value is greater than the first limit value and the first limit value is greater than a predetermined noise level of the detector unit.

This may advantageously prevent signal noise from being falsely interpreted. The reliability of the method is thereby increased further.

According to at least one embodiment, the method involves determining the predetermined noise level on the basis of test measurements.

According to the improved concept, a method for the at least partially automatic control of a motor vehicle is also provided. A point cloud for object recognition is generated by means of a method for object recognition according to the improved concept, and the motor vehicle is controlled at least partially automatically as a function of the point cloud, in particular of a result of the classification of the object on the basis of the point cloud, while taking the entry into account.

According to at least one embodiment, the second limit value is greater than the first limit value, and the second limit value is greater than a predetermined saturation limit value of the detector unit.

The saturation limit value may, for example, correspond to a maximum detector current so that the sensor signal is clipped at the saturation limit value, irrespective of a possibly higher intensity of the incident light.

Above the saturation limit value, a pulse width is therefore not meaningful, or is identically equal to zero.

According to at least one embodiment, the saturation limit value is determined beforehand in the method by further test measurements.

According to at least one embodiment of the method for at least partially automatic control of the motor vehicle according to the improved concept, the generation of the point cloud for object recognition by means of a method for object recognition according to the improved concept involves automatic classification of the object on the basis of the point cloud while taking the entry into account. The motor vehicle is controlled at least partially automatically as a function of a result of the classification.

According to the improved concept, an active optical sensor system, in particular for a motor vehicle, is also provided. The sensor system has a detector unit, which is adapted to register light reflected by an object in an environment of the sensor system and to generate a sensor signal on the basis of the registered light. The sensor system has a computer unit, which is adapted to determine a first pulse width of a signal pulse of the sensor signal, the first pulse width being established by a predetermined first limit value for an amplitude of the sensor signal. The computer unit is adapted to determine a second pulse width of the signal pulse, the second pulse width being established by a predetermined second limit value for the amplitude of the sensor signal. The computer unit is adapted to assign the signal pulse to one of at least two categories as a function of at least one predefined parameter of the signal pulse and to generate a point cloud for object recognition. The point cloud contains precisely one entry for the signal pulse, the entry corresponding either to the first pulse width or to the second pulse width as a function of the category of the signal pulse.

In particular, the active optical sensor system has an emitter unit, which is adapted to emit light in the direction of the object, and the detector unit is adapted to register components of the emitted light that are reflected by the object and to generate the sensor signal on the basis thereof.

Further embodiments of the active optical sensor system according to the improved concept result directly from the various configurations of the method for object recognition according to the improved concept, and vice versa. In particular, an active optical sensor system according to the improved concept may be adapted or programmed to carry out a method according to the improved concept, or carries out such a method.

According to the improved concept, an electronic vehicle guidance system for a motor vehicle is also provided. The vehicle guidance system has an active optical sensor system according to the improved concept, and the vehicle guidance system has a control device which is adapted to generate at least one control signal as a function of the point cloud, in order to control the motor vehicle at least partially automatically.

The control device may in this case contain, for example, the computer unit of the active optical sensor system.

According to the improved concept, a motor vehicle having an electronic vehicle guidance system according to the improved concept or an active optical sensor system according to the improved concept is also provided.

According to the improved concept, a first computer program having first instructions is provided. When the first instructions, or the first computer program, are executed by an active optical sensor system according to the improved concept, the first instructions cause the sensor system to carry out a method for object recognition according to the improved concept.

According to the improved concept, a second computer program having second instructions is also provided. When the second instructions are executed by an electronic vehicle guidance system according to the improved concept, or when the second computer program is executed by the vehicle guidance system, the second instructions cause the vehicle guidance system to carry out a method for the at least partially automatic control of a motor vehicle according to the improved concept.

According to the improved concept, a computer-readable storage medium, on which a first computer program according to the improved concept and/or a second computer program according to the improved concept is stored, is also provided.

The computer programs according to the improved concept and the computer-readable storage medium may be regarded as respective computer program products having the corresponding first and/or second instructions.

Further features of the invention may be found from the claims, the figures and the description of the figures. The features and combinations of features mentioned above in the description and the features and combinations of features mentioned below in the description of the figures and/or shown in the figures alone may be used not only in the particular combination indicated but also in other combinations without departing from the scope of the invention. Embodiments of the invention that are not explicitly shown and explained in the figures, but emerge and are producible from the explained embodiments by virtue of separate combinations of features, are therefore also intended to be regarded as encompassed and disclosed. Embodiments and combinations of features which therefore do not have all the features of an originally formulated independent claim are also intended to be regarded as disclosed. Furthermore, embodiments and combinations of features that go beyond or differ from the combinations of features set out in the back-references of the claims are intended to be regarded as disclosed, in particular by the embodiments set out above.

Figure 1:
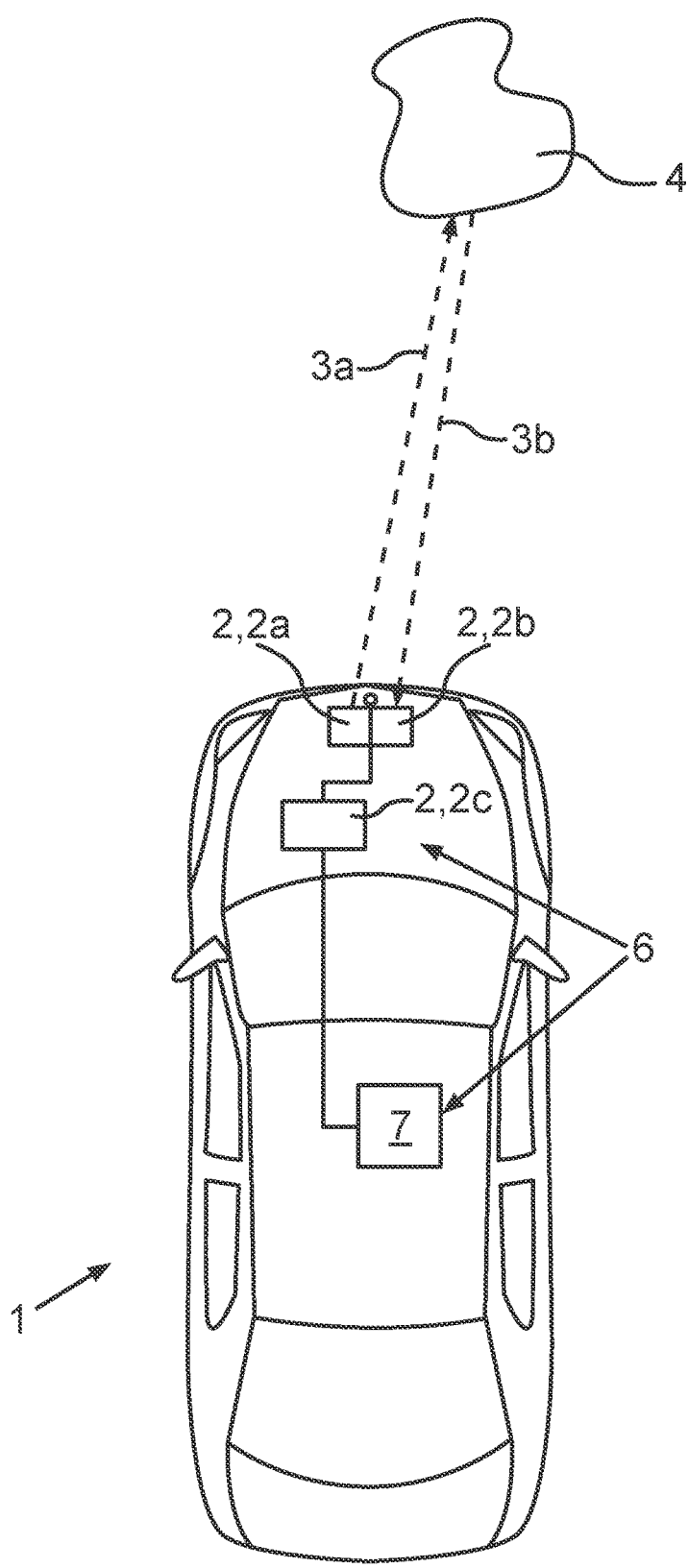
FIG. 1 shows a schematic representation of a motor vehicle with an exemplary embodiment of an electronic vehicle guidance system according to the improved concept.

FIG. 1 schematically represents a motor vehicle 1 which has an exemplary embodiment of a vehicle guidance system 6 according to the improved concept.

The electronic vehicle guidance system 6 has, in particular, an active optical sensor system 2 according to the improved concept. Optionally, the vehicle guidance system 6 may also have a control device 7.

The active optical sensor system 2 has an emitter unit 2a, which contains for example an infrared laser. The sensor system 2 furthermore has a detector unit 2b, which contains for example one or more optical detectors, for example APDs.

The sensor system 2 furthermore has a computer unit 2c. Functions of the computer unit 2c which are described below may also be undertaken in various configurations by the control device 7, or vice versa.

Figure 2:
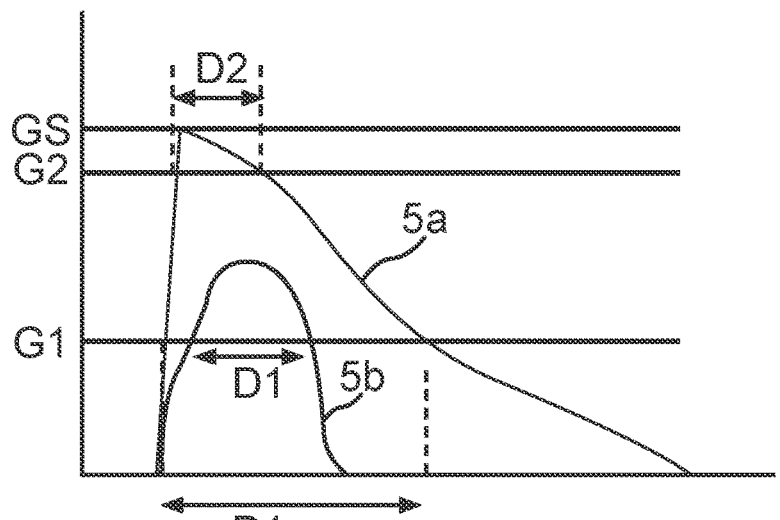
FIG. 2 shows a schematic representation of sensor signals of a detector unit of an exemplary embodiment of an active optical sensor system according to the improved concept.
Figure 3:
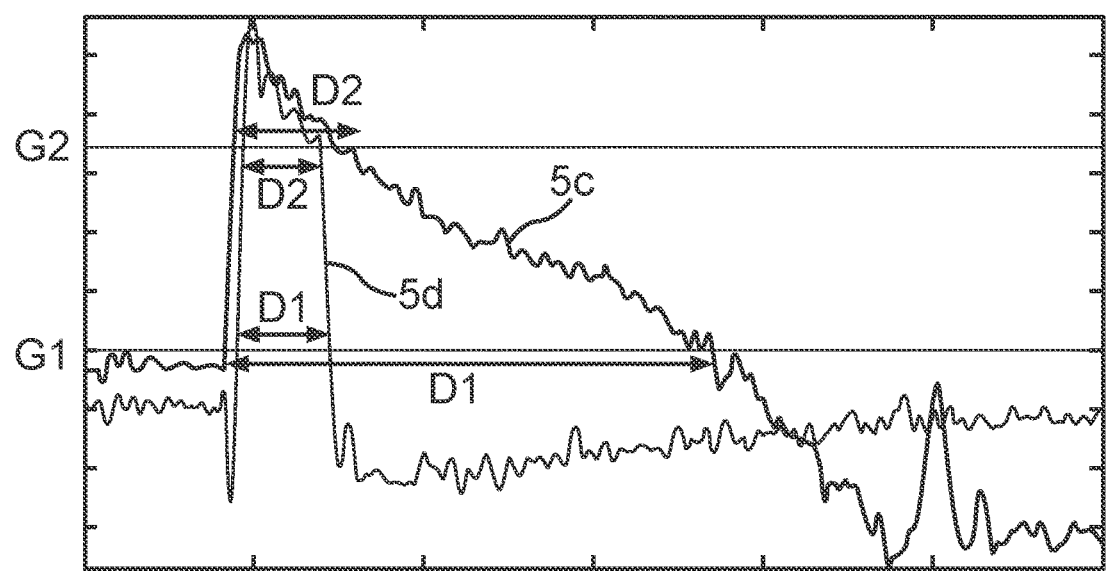
FIG. 3 shows a schematic representation of further sensor signals of a detector unit of a further exemplary embodiment of an active optical sensor system according to the improved concept.

The emitter unit 2a emits laser pulses 3a into the environment of the motor vehicle 1, where they are partially reflected by an object 4 and at least partially reflected back as reflected pulses 3b in the direction of the sensor system 2, and in particular of the detector unit 2b. The detector unit 2b, in particular the optical detectors of the detector unit 2b, registers the reflected components 3b and, on the basis thereof, generate a time-dependent sensor signal which has an amplitude that is proportional to the radiation intensity or radiation power of the registered light 3b. Corresponding examples of various signal pulses are represented in FIG. 2 and FIG. 3.

The computer unit 2c determines a first time interval, during which the sensor signal 5a, 5b, 5c, 5d exceeds a first limit value G1. This first time interval then corresponds to the first pulse width D1 of the corresponding signal pulse. In the same way, the computer unit 2c determines a second pulse width D2 by corresponding comparison of the sensor signal sensor signal 5a, 5b, 5c, 5d with a second limit value G2, which is greater than the first limit value G1.

The computer unit 2c or the control device 7 may then determine a property of the object 4, for example a reflectivity or an extent of the object 4, on the basis of the first pulse width D1 and the second pulse width D2.

In particular, the computer unit 2c or the control device 7 may classify the object 4 as a function of the property or of the pulse widths D1, D2.

On the basis of a result of the classification, or on the basis of the property of the object, the control device 7 then for example generates control signals in order to control the motor vehicle 1 at least partially automatically.

FIG. 2 shows two exemplary sensor signals 5a, 5b. While the signal pulse of the sensor signal 5a is reaching a saturation limit value GS, its amplitude thus in particular exceeds the second limit value G2, but this does not apply for the signal pulse of the sensor signal 5b. However, both sensor signals exceed the first limit value G1. Consequently, the first pulse width D1 is greater than zero for both sensor signals 5a, 5b. The second pulse width D2, on the other hand, is greater than zero only for the sensor signal 5a and is equal to zero for the sensor signal 5b.

If APDs are used as optical detectors, for example, the saturation limit value GS may for example be of the order of a few hundreds of mV, for example lying between 100 mV and 1000 mV.

FIG. 3 shows a further example of two further sensor signals 5c, 5d, Here, both the first pulse width D1 and the second pulse width D2 are greater than zero for both sensor signals 5c, 5d.

Figure 4:
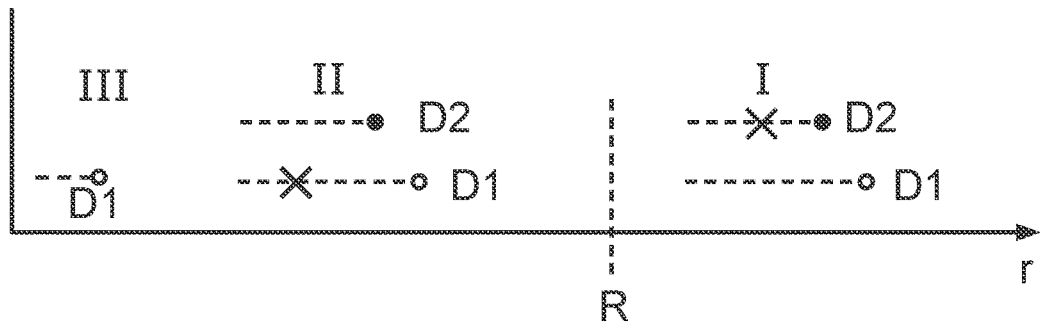
FIG. 4 shows a schematic representation of further sensor signals of a detector unit of a further exemplary embodiment of an active optical sensor system according to the improved concept.

The computer unit 2c generates a point cloud on the basis of the signal pulses, in particular respectively on the basis either of the first pulse width D1 or of the second pulse width D2. For this purpose, the signal pulses are assigned to one of three categories I, II, III, as represented schematically in FIG. 4.

If the radial distance r which has been determined for the signal pulse on the basis of the time-of-flight measurement is greater than a predefined limit distance R, it is unlikely that an object 4 in the vicinity of the motor vehicle 1 will reflect light with a sufficiently high intensity for the second limit value G2 to be exceeded, and the second pulse width D2 is accordingly greater than zero. Accordingly, the signal pulse is in this case assigned to a first category I. For signal pulses of category I, the corresponding entry for the signal pulse is generated in such a way that it reproduces the first pulse width D1.

If the radial distance r is less than the limit distance R, however, it may be assumed that pulses which do not reach the second limit value G2 are due to noise effects or are unreliable for other reasons.

Accordingly, signal pulses for which the particular radial distance is less than the limit distance R, and whose second pulse width D2 is greater than zero, are assigned to a second category II and those signal pulses for which the radial distance r is less than the limit distance R, and whose second pulse width D2 is equal to zero, are assigned to a third category III.

For signal pulses of category II, the entry of the point cloud relates to the second pulse width D2, and for signal pulses of category III the entry relates to the first pulse width D1.

Figure 5:
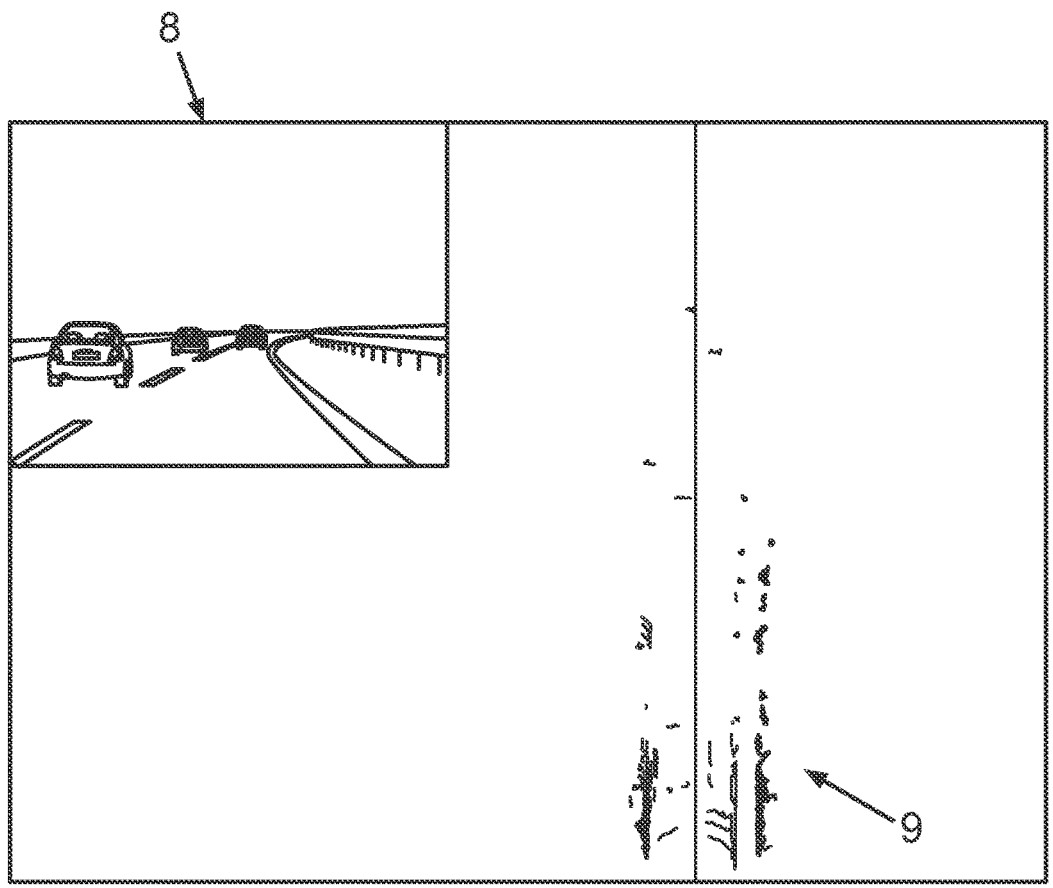
FIG. 5 shows a schematic representation of a camera image and a point cloud generated by a further exemplary embodiment of an active optical sensor system according to the improved concept.

FIG. 5 schematically represents a point cloud 9 which has been generated on the basis of the improved concept as described. Only those points which correspond to category I or category II are represented in the point cloud 9. Signal pulses of category III are not represented. This is possible by each entry being assigned an identifier or flag, which indicates the corresponding category I, II, III, or such an identifier being stored for each entry.

In this way, the points of category III may be filtered out since with a high probability they are due to noise effects.

By signal pulses having a radial distance r greater than the limit distance R being taken into account with the second pulse width D2, however, points are represented in the point cloud 9 even for relatively large distances from the sensor system.

FIG. 5 also schematically represents a corresponding camera image 8.

Figure 6:
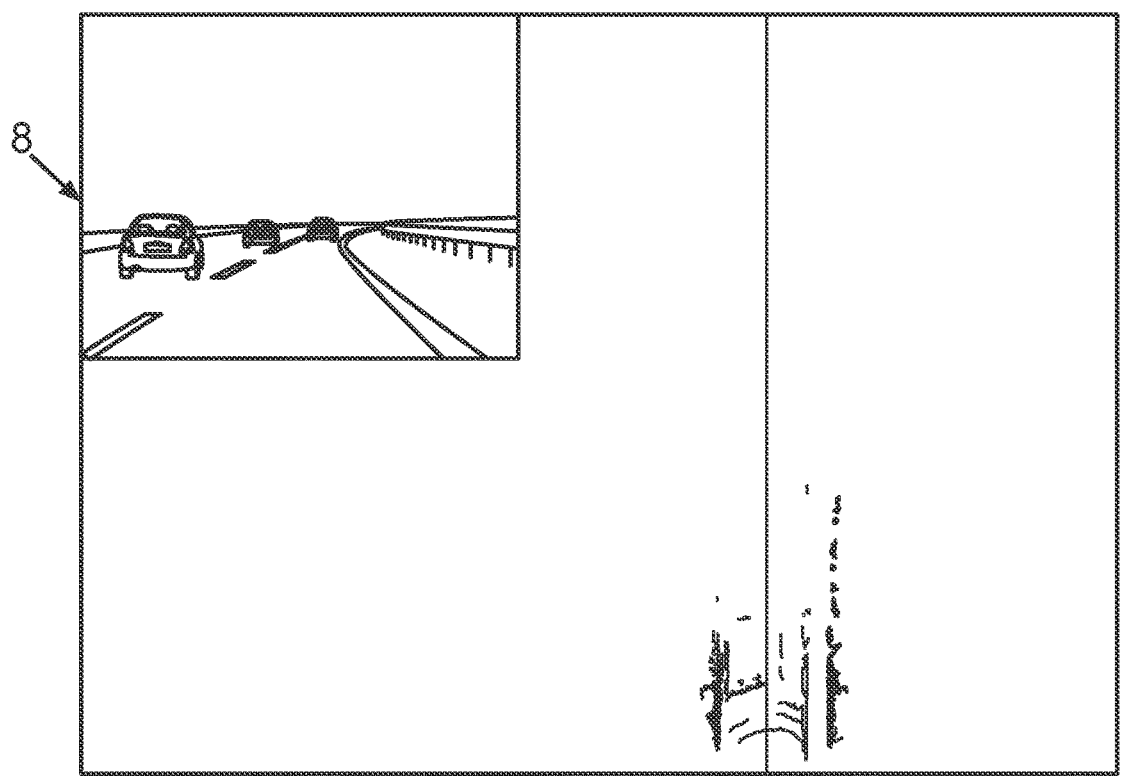
FIG. 6 shows a schematic representation of a camera image and a point cloud.

FIG. 6 schematically represents a further point cloud. In the point cloud of FIG. 6, the same signal pulses were used as a basis as were used as a basis for generating the point cloud 9 of FIG. 5. For FIG. 6, however, the second pulse width D2 was used for each entry. As may be seen from a comparison of FIG. 5 and FIG. 6, the effective range in the point cloud of FIG. 6 is less than for the point cloud 9 of FIG. 5.

Figure 7:
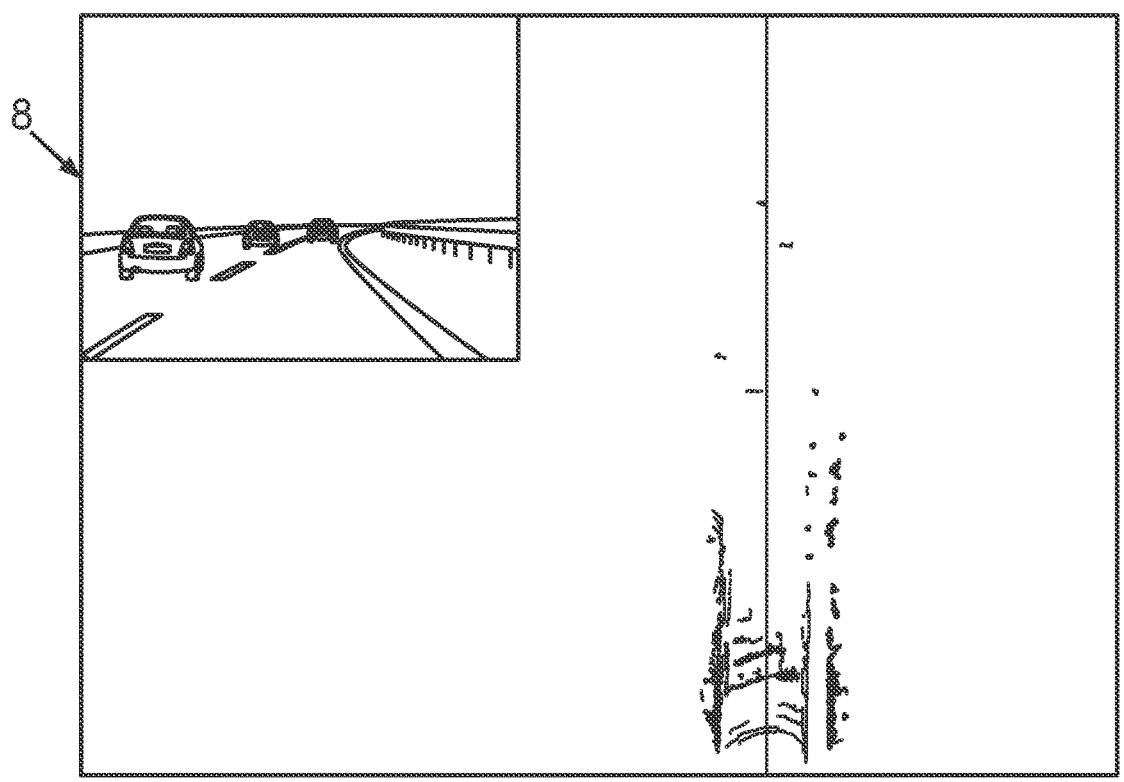
FIG. 7 shows a schematic representation of a camera image and a point cloud.

FIG. 7 shows a further point cloud, which was again based on the same signal pulses. For FIG. 7, however, the first pulse width D1 was used for all signal pulses. Correspondingly, it 5 may be seen that the range is comparable with the one that is provided by the point cloud 9 of FIG. 5. In the near field, however, the point cloud of FIG. 7 contains additional points which with a high probability are due to noise.

The improved concept, as described, makes it possible to provide a point cloud for object recognition or object classification, which on the one hand has a lesser influence of noise and, on the other hand, emulates a high sensitivity of the sensor system. Furthermore, the improved concept saves on memory space, particularly in comparison with the storage of two complete point clouds.

In various configurations of the improved concept, a hybrid point cloud is thus generated in order to convert the analog signal pulses into the discrete domain. For example, each point may be assigned a flag according to how great the radial distance from the sensor system is and how high the maximum amplitude of the signal pulse is. In this way, points whose radial distance is small and whose maximum amplitude is likewise small may be filtered out since they are due to interference or noise.

The invention claimed is:

1. A method for object recognition by an active optical sensor system, comprising:
   registering light reflected by an object in an environment of the sensor system by a detector unit of the sensor system and a sensor signal is generated on the basis of the registered light;
   determining a first pulse width of a signal pulse of the sensor signal by a computer unit, the first pulse width being established by a predetermined first limit value for an amplitude of the sensor signal;
   wherein the computer unit is configured to:
   determine a second pulse width of the signal pulse, the second pulse width being established by a predetermined second limit value for the amplitude of the sensor signal;
   determine a radial distance of the object from the sensor system;
   assign the signal pulse to one of at least two categories as a function of at least one predefined parameter of the signal pulse, and
   generate a point cloud for object recognition, which contains precisely one entry for the signal pulse, the entry corresponding either to the first pulse width or to the second pulse width as a function of the category of the signal pulse,
   wherein the radial distance of the object from the sensor system is determined as a function of the signal pulse, and the signal pulse is assigned to the one of at least two categories as a function of the radial distance.

2. The method as claimed in claim 1, wherein: the second limit value is greater than the first limit value;
   the signal pulse is assigned to a first category of the at least two categories if the radial distance is greater than a predefined limit distance; and
   the point cloud is generated with the entry which corresponds to the first pulse width if the signal pulse has been assigned to the first category.

3. The method as claimed in claim 2, wherein:
   the signal pulse is assigned to a second category of the at least two categories if the radial distance is less than the limit distance and the second pulse width is greater than zero; and the point cloud is generated with the entry which corresponds to the second pulse width if the signal pulse has been assigned to the second category.

4. The method as claimed in claim 2, wherein the at least two categories contain at least three categories;
the signal pulse is assigned to a third category of the at least three categories if the radial distance is less than the limit distance and the second pulse width is equal to zero; and
the point cloud is generated with the entry which corresponds to the first pulse width if the signal pulse has been assigned to the third category.

5. The method as claimed in claim 1, wherein the entry contains an identifier that indicates the category to which the signal pulse has been assigned.

6. The method as claimed in claim 1, wherein the object is classified automatically on the basis of the point cloud while taking the entry into account.

7. The method as claimed in claim 1, wherein the second limit value is greater than the first limit value and the first limit value is greater than a predetermined noise level of the detector unit; and/or the second limit value is greater than the first limit value, and the second limit value is greater than a predetermined saturation limit value of the detector unit.

8. A method for the at least partially automatic control of a motor vehicle, comprising:
generating a point cloud for object recognition by a method as claimed in claim 1; and
controlling the motor vehicle at least partially automatically as a function of the point cloud.

9. The method as claimed in claim 8, wherein the point cloud is generated by object classification automatically on the basis of the point cloud while taking the entry into account; and
the motor vehicle is controlled at least partially automatically as a function of a result of the classification.

10. An active optical sensor system, comprising:
a detector unit, which is adapted to register light reflected by an object in an environment of the sensor system and to generate a sensor signal on the basis of the registered light;
a computer unit, which is adapted to determine a first pulse width of a signal pulse of the sensor signal, the first pulse width being established by a predetermined first limit value for an amplitude of the sensor signal; and
wherein the computer unit is adapted to:
determine a second pulse width of the signal pulse, the second pulse width being established by a predetermined second limit value for the amplitude of the sensor signal;
determine a radial distance of the object from the sensor system;
assign the signal pulse to one of at least two categories as a function of at least one predefined parameter of the signal pulse; and
generate a point cloud for object recognition, which contains precisely one entry for the signal pulse, the entry corresponding either to the first pulse width or to the second pulse width as a function of the category of the signal pulse,
wherein the radial distance of the object from the sensor system is determined as a function of the signal pulse, and the signal pulse is assigned to the one of at least two categories as a function of the radial distance.

11. An electronic vehicle guidance system for a motor vehicle comprising:
an active optical sensor system as claimed in claim 10; and
a control device, which is adapted to generate at least one control signal as a function of the point cloud, in order to control the motor vehicle at least partially automatically.

12. A non-transitory computer-readable storage medium which stores a computer program which, when executed by an electronic vehicle guidance system as claimed in claim 11, cause the vehicle guidance system to perform a method comprising:
registering light reflected by an object in an environment of the sensor system by a detector unit of the sensor system and generating a sensor signal on the basis of the registered light;
determining a first pulse width of a signal pulse of the sensor signal by a computer unit, the first pulse width being established by a predetermined first limit value for an amplitude of the sensor signal;
the computer unit being further configured to:
determine a second pulse width of the signal pulse, the second pulse width being established by a predetermined second limit value for the amplitude of the sensor signal;
assign the signal pulse to one of at least two categories as a function of at least one predefined parameter of the signal pulse; and
generate a point cloud for object recognition, which contains precisely one entry for the signal pulse, the entry corresponding either to the first pulse width or to the second pulse width as a function of the category of the signal pulse.

* * * * *